UNITED STATES PATENT OFFICE 2,407,037

LUBRICANT AND PROCESS OF LUBRICATING SURFACES THEREWITH

Frank J. Sowa, Cranford, N. J.

No Drawing. Application October 21, 1939,
Serial No. 300,555

6 Claims. (Cl. 252—53)

The invention relates in general to lubrication and in particular to lubricants comprising organic silicon compounds and includes correlated improvements designed to enhance their characteristics and extend their fields of use.

The properties of a lubricant which are of most importance in determining the success with which it prevents friction in a bearing are its viscosity, its "oiliness," and its surface tension. Other characteristics which influence the qualities of a lubricant are the chill point, freedom from corrosive impurities, particularly those which corrode metals and swell rubber, flash point, vapor pressure and carbon residue.

The viscosity is the most important characteristic, since the friction of perfectly lubricated bearings depends upon the viscosity of the lubricant. However, the oiliness has been found to have perhaps an equally important effect upon the lubricating efficiency. Oiliness, or "body" of an oil, is not distinguished by such tests as viscosity, specific gravity, and the like. It may be that the composition of a layer of lubricant at the surface between the lubricant and the lubricated metal is somewhat different from that of the main body of lubricant. Probably the surface layer varies from the body of the lubricant by reason of the lubricant adsorption on the surface contacted. This tendency to form absorbed surface layers is called by the trade "oiliness." The surface tension of a lubricant determines the facility with which it wets the bearing surfaces and tends to creep into the engaging surfaces when the mechanism is static. Thus surface tension determines the ability of a bearing to start with a minimum amount of solid friction, and the success with which a lubricant completely separates the two parts mechanically when the parts are in motion.

It is a general object of the invention to provide a lubricant having a low viscosity over a wide range of temperature, a high surface tension, a low coefficient of friction and a substantial oiliness.

It is another object to provide a lubricant having a low chill point, that is, one which remains fluid at low temperatures, and which will have a relatively low vapor pressure.

It is a further object to provide a lubricant which will have a neutral reaction and which will not corrode metals and which will have a relative low swelling action on natural or synthetic rubber.

According to the present invention, a lubricant having novel characteristics satisfying the above objects comprises an organic silicon compound selected from the class consisting of the hydrolysis products of organic silicanes and polymers of said hydrolysis products.

In my copending application, Serial Number 141,756, filed May 10, 1937, I have disclosed and claimed as lubricants, unhydrolysed organic silicanes per se having the general formula:

in which $x$ has the value of 1, 2, 3 or more, R is a saturated or unsaturated alkyl, aryl, aralkyl, alkaryl group having at least two carbon atoms and N is hydrogen, hydroxyl, an OR group, or another R group, the sum of the carbon atoms in the compound being at least eight. The silicon hydrolysis products employed in the lubricant of the present invention are superior to the unhydrolyzed organic silicanes and comprise compounds resulting from the hydrolysis of silicanes or organic silicon compounds having the following general formula:

in which R is a saturated or unsaturated organic radical. As previously mentioned M is a halogen atom or an —OR' group, $y$ has a value of 1 or 2, $z$ has a value of 2 or 3, the sum of $y$ and $z$ being 3 or 4 and the remaining silicon valences, if any, being occupied by hydrogen. Both R and R' may be an organic radical such for example as an alkyl, an aryl, an alkaryl or an aralkyl group. The products of the hydrolysis of the organic silicon compounds according to the present invention include silicols, such for example, as compounds of the type $(R—SiOH)_x$, silicyl ethers, such for example, as compounds of the type of

silicones, such for example as compounds of the type of $(R—SiO)_x$ in all of which compounds $x$ has a value of 2, 3 or more, and R is a saturated or unsaturated organic radical such for example as an alkyl, an aryl, an alkaryl or an aralkyl group. The organic silicon polymers of the invention are compounds resulting from the continued hydrolysis of the compounds R₂SiM₂ just described and may be dimers, trimers, or higher polymers, but in every case they are compounds containing two or more silicon atoms linked through oxygen. The polymers of the invention appear to comprise linear or cyclic compounds of the following types:

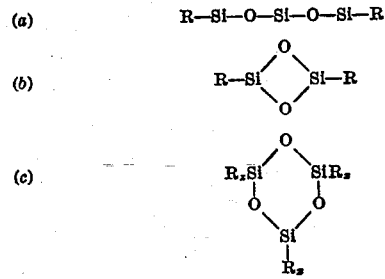

or a mixture of two or more of such compounds.

The organic silicon compounds employed in the invention are the products of the hydrolysis of organic silicanes, such products consisting of the hydrolysis products per se and polymers of the hydrolysis products.

By way of illustrating but not by way of limiting the invention, the new series of silicon polymers will be illustrated by hydrolysis of the mono-alkyl-alkoxy silicanes, and mono-alkyl halo-silicanes, but the invention is not limited to the products resulting from the hydrolysis of such compounds. Such silicanes may be prepared by any suitable reaction known to those skilled in the art, such, for example, as by the so-called Grignard reaction, or by allowing sodium to act upon a mixture of alkyl halide and silicon halide:

$$2Na + RX + XSi(X)_3 \rightarrow 2NaX + R-SiX_3$$

The Grignard reagent employed may be any suitable alkyl metal halide such, for example, as methyl magnesium chloride, ethyl aluminium bromide or propyl zinc iodide and the like. The Grignard reagent is allowed to act upon a silicon compound in such an amount that the silicane resulting from the reaction contains at least one alkyl group, as shown in the equation:

$$R-MgX + Si(OR)_4 \rightarrow RSi(OR)_3 + ROMgX$$

The silicon compound should be those in which the groups attached to the silicon are capable of being split off by hydrolysis after the Grignard reaction as hereinafter described. Suitable silicon compounds are tetra- or tri-halosilicanes, or tetra- or tri-alkoxyl silicanes or mixed halo alkyloxy silicanes, such, for example, monofluortrialkoxysilicane, dibrom-dialkoxy-silicane, trichlorsilicane, tetrachlorsilicane, tetrafluorosilicane, and the like, and organic silicates (silicic acid esters) such as the mono-, di-, tri-, or tetra-alkyoxy silicanes, for example, di-ethyl silicates, and tri-ethyl silicates, tetra-methyl silicates, and the like.

When the alkyl alkoxyl silicanes or the alkyl-halo-silicanes are treated with water, preferably in the presence of a suitable catalyst, hydrolysis occurs and an oxygen-containing silicon polymer is formed. For the catalyst an acid or a base may be employed, such for example as sulfuric acid, hydrochloric acid, nitric acid or sodium hydroxide, potassium hydroxide and ammonium hydroxide. The silicon derivative may be heated with water at a temperature of from 30° to 100° C. Heat, although not necessary, will accelerate the reaction. In fact, in the presence of water without any additional catalyst, heat alone will usually cause the reaction to occur, although only slowly. The time required with or without a catalyst, varies with the compounds used and the extent of the hydrolysis desired.

As a result of the initial hydrolysis silicols, silicones, silicyl ethers, and polymers thereof are formed. Under continued hydrolysis conditions preferably with heating the polymerization may be continued to a much greater extent. Continued heating is the easiest and simplest means of continuing the polymerization, although other methods such as increasing the pressures above atmospheric pressure for instance, to pressures of from 15 to 1000 pounds per square inch will serve the same purpose by enabling the temperature to be increased. The polymers range from dimers and trimers to very large polymers and their properties vary accordingly. Among other properties, as the size of the molecules is increased, their viscosity and boiling points increase. According to the degree of polymerization and the nature and number of the alkyl group substituted the products of the hydrolysis vary from thin liquids to viscous. In general the polymers are liquids, have high flash points, low vapor pressure, a specific gravity of about one or less and a low chill point, in some cases as low as −90° F. and in many cases below −30° F.

The hydrolysis products and their polymers may be used alone as lubricants and they may be diluted to change the viscosity and flow characteristic as desired by mixing them with suitable diluents and/or with suitable known lubricants. Among the diluents that may be used are those which are miscible with the silicon polymer, having a suitable viscosity, a low vapor pressure and which do not corrode metals or substantially swell natural or synthetic rubber, such for example as paraffin hydrocarbons, aliphatic alcohols, diacetone alcohol, fusel oil, di-hydric alcohols and the glycol ethers and the like. The organic silicon polymers give new and unusual results when used as addition products to known lubricants such for example as natural hydrocarbon oils and greases having a paraffin or naphthene base, vegetable oils and synthetic oils, and greases made with soaps, fatty acids, and fatty acid esters.

In preparing the lubricant, I add to a suitable known lubricating oil one or a mixture of two or more of my silicon polymers in quantity sufficient to improve the value of the oil as a lubricant to any desired extent, depending upon the operating conditions under which the lubricant is to be used. I have found that the quantity of reaction product required, in general, does not exceed substantially 50% by weight of my silicon polymer. Quantities as small as 3%, or even 1% or less, have been found to improve lubricating oils to a satisfactory extent. In preparing my lubricant, I may obtain a homogeneous solution or stable suspension of my silicon polymer in the oil by agitating the mixture at normal or elevated temperatures, or I may dissolve the silicon polymer in a suitable solvent and add the resulting solution to the oil, thereafter removing the solvent by vaporization, if necessary.

By way of illustrating but not by way of limiting the invention, there will be given the following examples:

*Example 1.*—Mono n-amyl tri-methoxy silicane was prepared by reacting 393 grams of n-amyl magnesium chloride (the Grignard reagent) with 457 grams of methyl silicate dissolved in ethyl ether, refluxing the product for three hours and distilling off the n-amyl tri-methoxy silicane at from 135° C. to 200° C. The product was hydrolysed by heating at 90° C. 96.1 grams of the n-amyl tri-methoxy silicane with 27.1 grams of water for twelve minutes, whereupon the two layers disappear and a homogeneous liquid is produced. After a few minutes further heating the liquid separates into an oily layer and an aqueous layer. Water and some methyl alcohol are distilled off and 65 grams of a silicon polymer as a viscous oil remain. 50 parts, by volume, of the oily silicon polymer thus produced are added to 50 parts of a hydrocarbon oil, such as "Gulf" oil No. 501 having a viscosity index of 58. The resulting lubricant has a viscosity index of 145 which adapts the lubricant for a wider variety of uses than is possible with the Gulf oil.

If 5 parts, by volume, of this same polymer is added to 95 parts of a No. 20 S. A. E. motor oil the load carrying value of the oil changes from 40 lbs. to 280 lbs. when measured on a "Timken" machine of the known type used for measuring the excessive pressure values of oils.

*Example II.*—The product of the aqueous hydrolysis of diamyl dialkoxy silicane is prepared as above described, and 8 parts of the polymer that boils between 180°–340° C. (at 5 mm.) is added to 92 parts of "Gulf" oil No. 501. The viscosity index of the oil is increased from 58 to 135.

Among the unforeseen advantages of the use of the organic silicon polymers as lubricants alone are that they have a wide viscosity range, a high surface tension, low chill points and relative low vapor pressures. The silicon polymers of the invention have a low coefficient of friction and show a substantial oiliness, or tendency to form adsorbed layers on metal surfaces. However, the silicon polymers when used as lubricants do not corrode metals and have a low swelling action on natural or synthetic rubber. When the silicon polymers are used in combination with oils the combination exhibits the following novel characteristics:

*a.* The combination has a much higher load carrying value than the pure oil and is thus able to withstand excessive pressures of much higher value.

*b.* The combination shows a greatly increased viscosity index as compared with the oil alone.

*c.* The composition is stable over long periods of time without showing any separation of the ingredients.

In view of the above mentioned novel characteristics, the silicon polymers alone or in combination with oils find a special application as lubricants for the following:

1. All instruments and apparatus that operate at low temperatures because of the low pour point of the lubricant.

2. All instruments and apparatus that operate over a wide temperature range. The high viscosity index is a decided advantage in this case.

3. All instruments containing natural or synthetic rubber because of the minimum swelling effect upon the rubbers, especially on neoprene.

4. Timers and motors that are used in synchronizing mechanisms that work over a temperature range, for example, in beam directional equipment for aviation purposes.

5. Gyro mechanisms for airplanes, cameras, watches, clocks and watch-like mechanisms of delicate nature.

6. Turbines and heavy apparatus in which the lubricated parts are under excessive pressures.

I claim:

1. The method of lubricating relatively moving metallic surfaces which comprises maintaining between the bearing surfaces a lubricant film comprising a hydrolysis product of an organic silicane.

2. The method of lubricating relatively moving metallic surfaces which comprises maintaining between the bearing surfaces a lubricant film comprising a polymer resulting from the hydrolysis of an organic silicane.

3. A lubricant comprising a lubricating oil and a hydrolysis product of an organic silicane.

4. A lubricant comprising a lubricating oil and a linear organic silicon hydrolytic polymer having the general formula $R(SiO)_xSiR$ in which $x$ has the value of 2 or more and R is an alkyl, aryl, alkaryl, or aralkyl group.

5. A lubricant comprising a lubricating oil and a cyclic organic silicon hydrolytic polymer having at least one organic radical attached to silicon and which silicon is linked to silicon through oxygen.

6. A lubricant comprising a lubricating oil and a polymer resulting from the hydrolysis of an organic silicane.

FRANK J. SOWA.